US006505285B1

(12) United States Patent
Rabinovici et al.

(10) Patent No.: US 6,505,285 B1
(45) Date of Patent: Jan. 7, 2003

(54) SCRATCH SEGMENT SUBSYSTEM FOR A PARALLEL PROCESSING DATABASE SYSTEM

(75) Inventors: Sorana Rabinovici, Woodland Hills, CA (US); Daniel H. Miller, Hermosa Beach, CA (US)

(73) Assignee: NCR Corporation, Dayton, OH (US)

( * ) Notice: Subject to any disclaimer, the term of this patent is extended or adjusted under 35 U.S.C. 154(b) by 344 days.

(21) Appl. No.: 09/603,787

(22) Filed: Jun. 26, 2000

(51) Int. Cl.$^7$ .............................................. G06F 12/00
(52) U.S. Cl. ...................... 711/170; 156/203; 156/208
(58) Field of Search ................................. 711/170, 156, 711/203, 208

(56) References Cited

U.S. PATENT DOCUMENTS

| | | | | |
|---|---|---|---|---|
| 4,742,447 A | * | 5/1988 | Duvall et al. ................... | 709/1 |
| 5,519,846 A | | 5/1996 | Swenson | |
| 5,652,853 A | | 7/1997 | Duvalsaint et al. | |
| 5,778,395 A | | 7/1998 | Whiting et al. .............. | 707/204 |
| 5,960,181 A | * | 9/1999 | Sanadidi et al. .............. | 703/17 |
| 5,978,576 A | * | 11/1999 | Sanadidi et al. .............. | 703/22 |
| 6,078,994 A | | 6/2000 | Carey | |
| 6,351,749 B1 | * | 2/2002 | Brown et al. ................. | 707/10 |
| 6,415,280 B1 | * | 7/2002 | Farber et al. ................. | 707/10 |

OTHER PUBLICATIONS

"Dual Task Hardware Partitioned Local Working Store" IBM Technical Disclosure Bulletin, IBM Corp. New York, US, vol. 40, No. 2, Feb. 1, 1997, pp. 29–31, XP000692159, ISSN 0018–8689.

H.P. Katseff & B.S. Robinson, "Predictive Prefetch in the Nemesis Multimedia Information Service," ACM 1994, pp. 201–209.

W.C. Brantley, K.P. McAuliffe, J. Weiss, "The Cache," IEEE, 1985, pp. 782–789.

A. Witkowski, F. Carino & P. Kostamaa, "NCR 3700—The Next Generation Industrial Database Computer," Proceeding of the 19$^{th}$ VLDB Conference, Dublin, Ireland, 1993, 14 pages.

F. Carino, Jr., W. Sterling, P. Kostamaa, "Industrial Database Supercomputer Exegesis: The DBC/1012, The NCR 3700, The Ynet, and The Bynet,"Teradata Advanced Concepts Laboratory, 1994, pp. 139–157.

TechEncyclopedia, "virtual memory," http://www.techweb.com/encyclopedia/defineterm?term=virtual+memory, Mar. 10, 2000, 1 page.

TechEncyclopedia, "kernel," http://www.techweb.com/encyclopedia/defineterm?term=KERNEL&exact=1, Mar. 10, 2000, 1 page.

* cited by examiner

Primary Examiner—Reba I. Elmore
(74) Attorney, Agent, or Firm—Gates & Cooper

(57) ABSTRACT

One or more embodiments of the invention provide for a SEG (segment) subsystem of a parallel database extension (PDE) that provides services for creating, manipulating, and destroying access to data segments in address space. The SEG subsystem works with transient segments (also referred to as scratch segments) that are created as offsets in a "well-known" file created during initialization of the PDE. The offsets are stored in objects/elements in a queue in the virtual address space of the SEG subsystem. Upon partitioning addressable memory into one or more scratch segments, obtaining the offsets for the scratch segments, and mapping the offsets into the SEG system's virtual address space, the physical memory is locked. When the scratch segments are needed, an element/object from the queue containing the appropriate size scratch segment is mapped into the requestor's address space. Once mapped to the requestor's address space, the element is unmapped from the SEG's virtual address space. Thereafter, the requestor can utilize the scratch segment as desired (in accordance with the access granted by the SEG subsystem).

23 Claims, 3 Drawing Sheets

SCRATCH SEGMENT SUBSYSTEM FOR A PARALLEL PROCESSING DATABASE SYSTEM

CROSS REFERENCE TO RELATED APPLICATIONS

This application is related to the following co-pending and commonly assigned patent applications, which are incorporated by reference herein:

application Ser. No. 09/410,389, now U.S. Pat. No. 6,351, 749, entitled "MULTI-THREADED MULTI-TASKING ARCHITECTURE FOR A RELATIONAL DATABASE MANAGEMENT SYSTEM," filed on Sep. 30, 1999, by Douglas P. Brown et al., and application Ser. No. 09/603,786 entitled "FILE SEGMENT SUBSYSTEM FOR A PARALLEL PROCESSING DATABASE SYSTEM," filed on the same date herewith, by Sorana Rabinovici et al.

BACKGROUND OF THE INVENTION

1. Field of the Invention

This invention relates in general to a relational database management system, and in particular, to memory management on a parallel processing database system.

2. Description of Related Art

The purpose of this invention is to enable kernel addressable, user accessible memory segments. The problem is to enable such capabilities in a parallel processing relational database management system (RDBMS) that can execute on both WINDOWS NT™ and UNIX operating systems for both symmetric multi-processing (SMP) and massively parallel processing (MPP) hardware architectures. The problem for the RDBMS is to design it in such a manner as to allow the RDBMS to execute independent of operating system models.

To accommodate the various operating systems, kernel addressable, user accessible memory segments must be controllable by a single entity within the system and be lockable and coherent among multiple processes. To provide these abilities in the UNIX environment, a page table of database processes may be directly modified. However, such direct page table modification is not available or possible in the WINDOWS NT operating system. Further, a number of requirements exist for the passing of segments between a parent and child process, and between user processes and kernel threads. Such requirements are in direct contradiction to the WINDOWS NT shared memory model.

SUMMARY OF THE INVENTION

To overcome the limitations in the prior art described above, and to overcome other limitations that will become apparent upon reading and understanding the present specification, the present invention discloses a parallel processing architecture for a relational database management system (RDBMS) that manages and allocates memory as mappings of offsets from a file storage location to one or more threads. The RDBMS is implemented as a shared nothing, single database image utilizing Parallel Database Extensions (PDEs) comprised of various subsystems for managing memory and providing storage locations for threads.

Embodiments provide for a segment (SEG) subsystem of the PDE that provides services for creating, manipulating, and destroying access to data segments in address space. The SEG subsystem works with transient segments (also referred to as scratch segments) that are created during initialization of the PDE as offsets in a file. The offsets are stored in objects/elements in a queue.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

A system maintains predetermined sized scratch segments in the form of an offset in one or more files. A daemon of the segment system memory maps some of the offsets, locks the pages behind the offsets, and offers so built segments to the network to enter data. Accordingly, when the database task needs access to the data segment, the task merely needs to map the offset and access the data segment.

Hardware Environment

Figure 1:
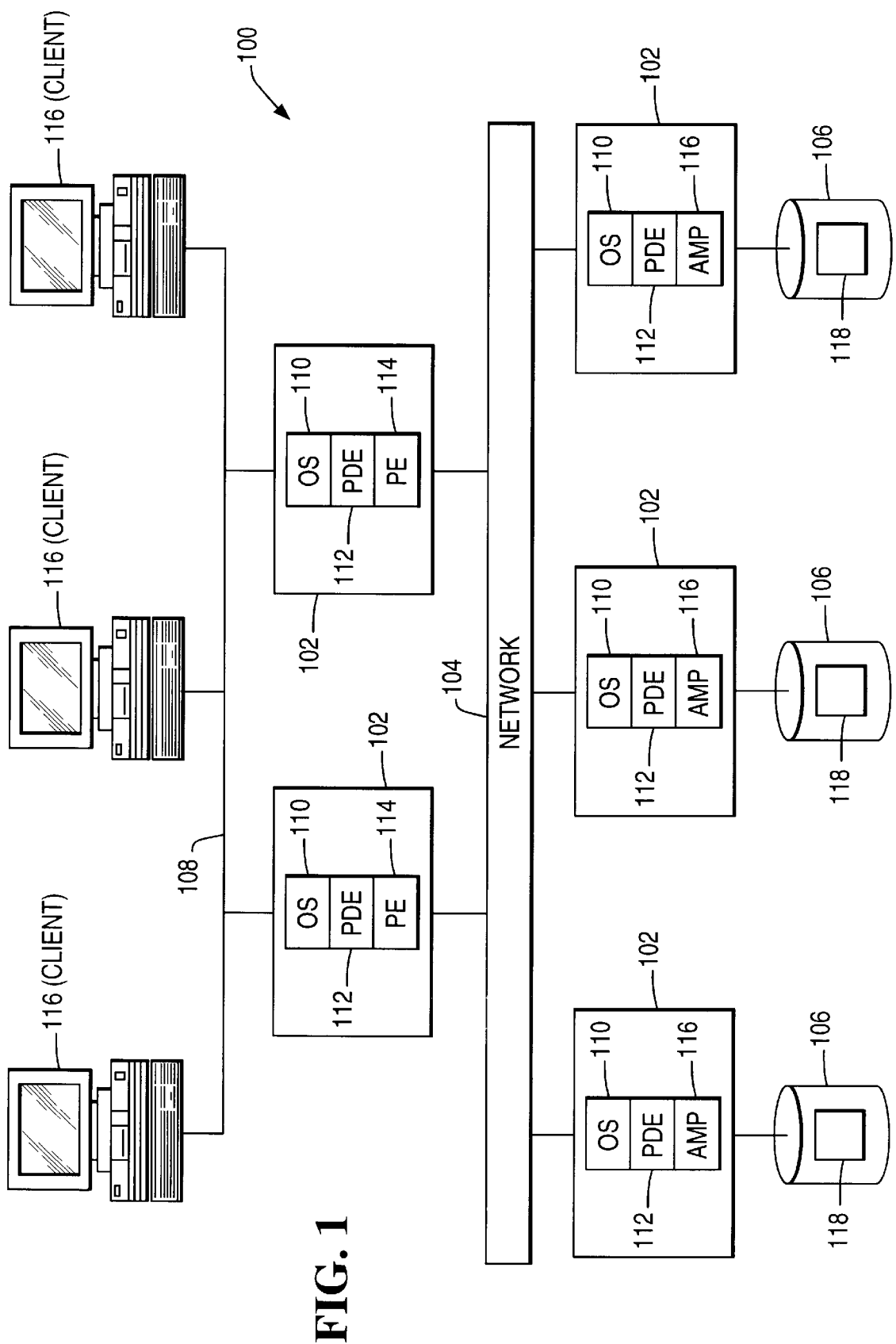
FIG. 1 is a block diagram that illustrates an exemplary computer hardware and software environment that could be used with one or more embodiments of the invention.

FIG. 1 is a block diagram that illustrates an exemplary computer hardware and software environment that could be used with one or more embodiments of the invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108, as is well known in the art.

Each of the nodes 102 operates under the control of an operating system (OS) 110, such as the WINDOWS NT or UNIX MP-RAS operating systems. Further, the OS 110 controls the execution of a shared-nothing, single-image relational database management system (RDBMS) comprised of Parallel Database Extensions (PDEs) 112, Parsing Engines (PEs) 114, and Access Module Processors (AMPs) 116.

The PDEs 112 provide a high speed, low latency, message-passing layer for use in communicating between the PEs 114 and AMPs 116. Further, the PDE 112 is an application programming interface (API) that allows the RDBMS to operate under either UNIX MP-RAS or WINDOWS NT, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. Both the PEs 114 and AMPs 116 are known as "virtual processors" or "vprocs."

The vproc concept is accomplished by executing multiple threads or processes in a node 102, wherein each thread or process is encapsulated within a vproc. The vproc concept adds a level of abstraction between the multi-threading of a work unit and the physical layout of the parallel processor computer system 100. Moreover, when a node 102 comprises a plurality of processors, the vproc provides for intra-node 102 as well as the inter-node 102 parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

Work is divided among the nodes 102 in the system 100 by spreading the storage of the rows of each table in a database 118 across all of the AMPs 116 and the DSUs 106 (which are managed by the AMPs 116). Thus, each DSU 106 stores some of the rows of each table in the database 118 and work is managed by the system 100 so that the task of operating on the rows is performed by the AMP 116 managing the DSUs 106 that store the specific rows. Similarly, the PEs 114 fully parallelize all functions among the AMPs 116. As a result, the system of FIG. 1 applies a multiple instruction stream, multiple data stream (MIMD) concurrent processing architecture to implement the RDBMS.

Generally, the OS 110, PDEs 112, PEs 114, and AMPs 116 are tangibly embodied in and/or accessible from RAM, ROM, one or more of the DSUs 106, and/or a remote device coupled to the computer system 100 via one or more of the DCUs 108. The OS 110, PDEs 112, PEs 114, and AMPs 116 each comprise logic and/or data which, when read and executed by the computer system 100, causes the computer system 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

Scratch Segments

Figure 2:
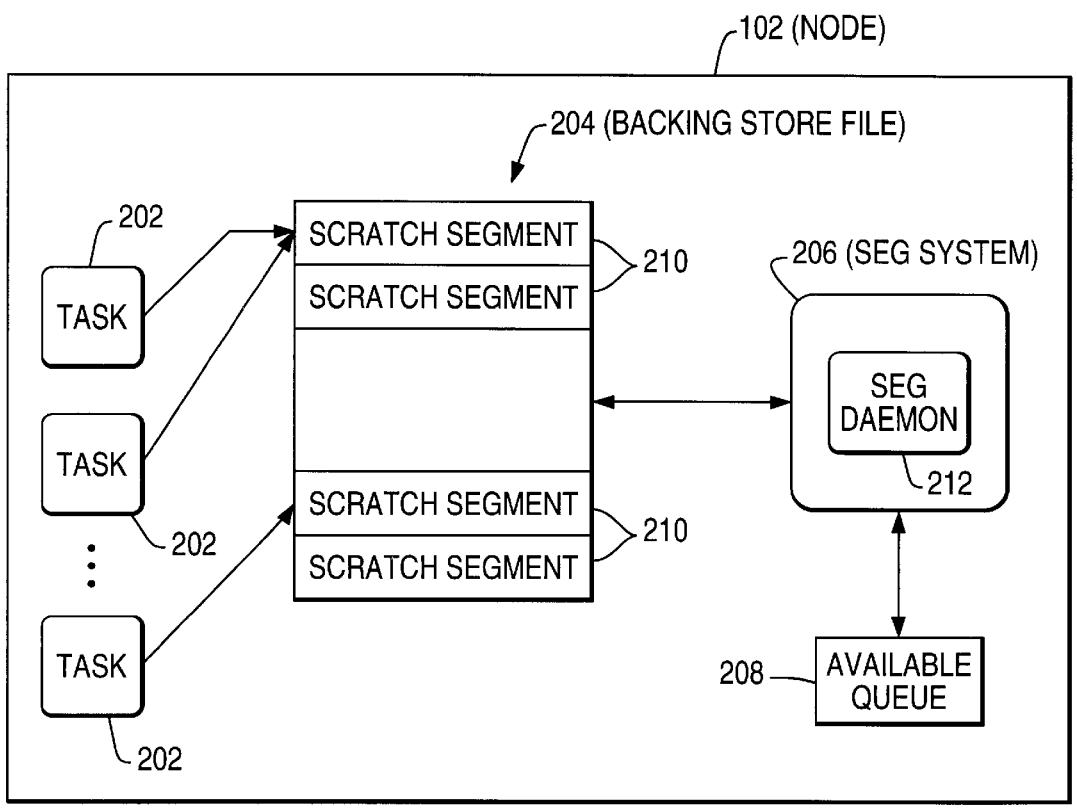
FIG. 2 is a block diagram that illustrates the use of memory segments in accordance with one or more embodiments of the invention.

FIG. 2 is a block diagram that illustrates the use of memory segments in accordance with one or more embodiments of the invention. Tasks 202 may utilize memory. Further, tasks often utilize transient memory segments (also referred to as scratch segments 210). An addressable file space backing store file 204 may be utilized as storage for one or more scratch segments 210. The addressable space 204 may be broken up/partitioned into scratch segments 210 of varying sizes. Each scratch segment 210 may be accessed using an offset for the location of that particular scratch segment 210 in the addressable space 204. As storage for the addressable space 204, a single backing store file or multiple backing store files may be utilized.

For a task 202 to access a particular scratch segment 210, the task needs to obtain the offset for the scratch segment 210. Segment (SEG) system 206 maintains one or more available queues 208 of the offsets for available scratch segments 210. Each queue 208 may contain offsets for scratch segments 210 of a particular size. When requested, SEG system 206 can map the relevant information from the available queue 208 to the virtual address space of the requesting task 202. Additionally, SEG system 206 can map the same scratch segment 210 to multiple tasks 202.

Thus, in one or more embodiments, the PDE 112 (and the SEG subsystem 206 of PDE 112) reserves and maintains offsets for scratch segments 210. Further, the SEG system 206 maps the scratch segments 210 to the requesting task(s).

Segment Subsystem 206

A SEG (segment) subsystem 206 of the PDE 112 provides services for creating, manipulating, and destroying access to scratch segments 210 in address space 204. While a FSG (File Segment) subsystem of PDE 112 works on permanent file segments, the SEG subsystem 206 works with transient segments (also referred to as scratch segments 210) that are created as offsets in addressable space 204 (and backed up in a backing store file) created during initialization of the PDE 112. Such scratch segments 210 are made available to the various processes/threads 202 by mapping objects (containing information (e.g., an offset) about the segment 210) into the requestor's address space.

Advantages of the invention include providing sharable objects/scratch segments 210 to a node 102. By providing sharable scratch segments 210, the scratch segments 210 are available and identifiable to multiple processes 202/nodes 102. Additionally, the data from a scratch segment 210 may be provided to one or more nodes 102 without nodes 102 requesting the data. Accordingly, a BYNET™ network such as network 104 can bring data into a node 102 unrequested and without the node 102 knowing about the size of the data/scratch segment 210 or specifically allocating memory for the data/scratch segment 210.

The SEG subsystem 206 accomplishes the above functionality by maintaining each segment 210 in the form of an offset in a file and a size (that is predetermined). A daemon 212 of the SEG subsystem 206 provides the mapping (the offset and size) in its own virtual address space and locks the physical pages behind the offsets so that the network 104 can perform direct memory access (DMA) operations. Messages on the network 104 may be transmitted between the node 102 and the SEG daemon 212 to control such access and free up unused memory segments 210.

Figure 3:
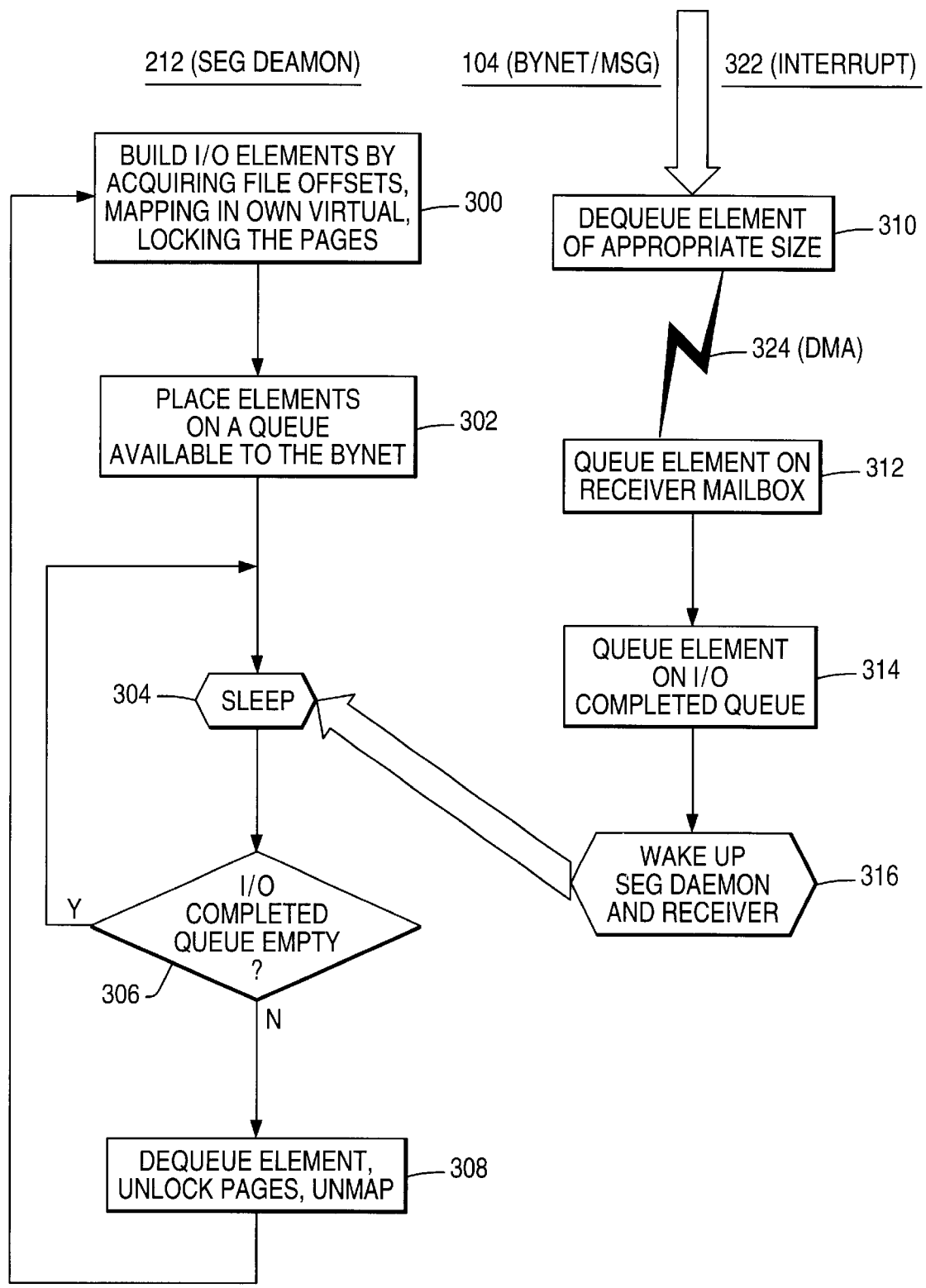
FIG. 3 illustrates the interaction between a daemon of the SEG subsystem and messages from nodes in accordance with one or more embodiments of the invention.

FIG. 3 illustrates the interaction between a SEG daemon 212 of the SEG subsystem 206 and messages on network/BYNET 104 from nodes 102. At step 300, SEG daemon 206 builds I/O (input/output) elements (e.g., objects representing the scratch segments 210) by acquiring file offsets (for pages/file segments 210 in addressable memory 204), mapping the offset in its own virtual memory, and locking the physical memory pages 210 so that the pages 210 remain in physical memory. Thus, the I/O elements contain information about the pages 210 including the offset and the size of the segment 210. At step 302, the elements are placed on a queue of available memory segments 208 for the network 104. Different queues 208 may be established with each queue 208 containing elements for segments 210 of a certain size. For example, one queue 208 may only contain elements for 64K segments 210, a second queue 208 may only contain elements for 1M segments 210, a third queue 208 may only contain elements for 4M segments 210, etc. Once the queue 208 is assembled, at step 302, the SEG daemon 212 waits/sleeps at step 304.

Messages on the network 104 are communicated within a node 102 or between nodes 102. When network 104 needs a scratch segment 210 (e.g., to deliver to a node 102), an interrupt 322 triggers the message/request for the segment 210 for a particular recipient 202 (e.g., a task or thread). The segment request message on network 104 specifies the segment size. The queue 208 (created at step 302) containing the appropriate size memory segment 210 is then identified. Since the segment sizes are predefined by SEG system 206, the minimum size segment 210 that accommodates the size required may be identified. At step 310, an element (from the appropriate queue 208) is dequeued from the identified queue 208. If no element meeting the requirements of the task 202 is available (e.g., the appropriate queue 208 is empty), the request may be placed on a wait queue and "sleeps" until the SEG daemon 212 wakes the task 202 up upon finding/obtaining a segment 210 that is available. The network performs a direct memory access (DMA) into the locked pages(324).

The element containing the segment information is queued in the mailbox(es) of the appropriate recipient(s) 202 at step 312. If multiple recipients 202 receive the element, a copy-on-write attribute for the segment 210 may be utilized. A copy-on-write lock provides that if the segment 210 is to be modified (i.e., by a write operation), a copy of the segment 210 is made and utilized.

At step 314, the element is placed onto an I/O completed queue. The I/O completed queue is a queue of elements which have been placed in the mailbox for the recipient 202 to map in but are yet to be unmapped from the address space of the SEG daemon 212 and its pages unlocked.

During the acquisition (by the node 102) of the appropriate scratch segment 210 (and scratch segment information), the recipient 202 of the segment 210 is "asleep"/waiting. The element is placed onto the completed I/O queue to inform the SEG daemon 212 to release the scratch segment 210. Thus, once the element is placed on the I/O completed queue, the SEG daemon 212 and the recipient 206 of the segment 210 are woken up at step 316. At step 306, the SEG daemon 212 determines if the I/O completed queue is empty. If the queue is empty, the SEG daemon 212 goes back to sleep at step 304. However, if the I/O completed queue contains elements, the scratch segment 210 is dequeued from the completed I/O queue, the physical pages are unlocked, and the element is unmapped from the SEG daemon's 212 address space at step 308. Thus, the data from scratch segment/page 210 is (1) mapped to the appropriate node/recipient 202 (i.e., step 312), and (2) the recipient 202 is woken up (i.e., step 316). The SEG daemon 212 no longer controls that scratch segment 210 and the recipient 202 can perform any actions needed (within the scope of the access rights granted).

The SEG daemon 212 continues its operation at step 300. Further, once mapped into a recipient's address space, information regarding the element/segment 210 is created and represented in a Segment Descriptor Block (SDB) structure in the case of a private segment. If the segment 210 is shared by more than one task 202 (e.g., a task 202 requires that a segment 210 be shared with other tasks 202), an identity/name is attached to the segment 210 so that all of the tasks 202 running on the system can identify the segment 210. When the segment 210 is shared, a Segment User Block (SUB) structure containing the details of a task 202 using the identified segment 210 is allocated/created. Thus, the SUB contains the lock held by a task 202 on the segment 210 and the virtual address at which it is mapped into the task 202. Whenever a shared segment 210 is accessed by a new user 202 (e.g., whenever the segment is mapped to a new user's address space), a new SUB is created. The SDB and SUB are utilized to clean up the resources for each task 202 in case of a reset/shutdown.

Once the node 102/recipient 202 has finished using the scratch segment 210, the recipient 202 may notify/wake-up the SEG system 206. The SEG system 206 maintains information regarding a segment 210 including a list of those nodes 102/recipients 202 that are accessing the segment 210 and the type of access. The SEG system 206 examines the SUBs or SDB to determine the appropriate action to take. Based on the number of current users (accessors) 202 and type of access, the SEG system 206 may allow the segment 210 to persist or may free up the segment/page 210 (e.g., place the segment 210 back on the available queue 208, discard/destroy/deallocate the segment 210, etc.).

The memory for a segment 210 can be freed up or discarded only when it has one accessor 202. Otherwise, the memory for a segment 210 may be unmapped from the requestor's address space but its contents are not destroyed (i.e., the memory for segment 210 remains persistent). For example, the memory for a segment 210 is unmapped from the user's address space and discarded/destroyed (and may be placed back into the available queue 208) if the requesting task 202 is the only accessor to the segment 210 (e.g., if only one SUB exists (the reference count is one) and the owner of the SUB has notified the SEG system 206 that the segment 210 is no longer needed). To discard the segment 210, the SUB and SDB may also be dropped/discarded. Alternatively, if the reference count for the number of accessors is more than one, the segment 210 may merely be unmapped from the user's address space and remain persistent.

Figure 4:
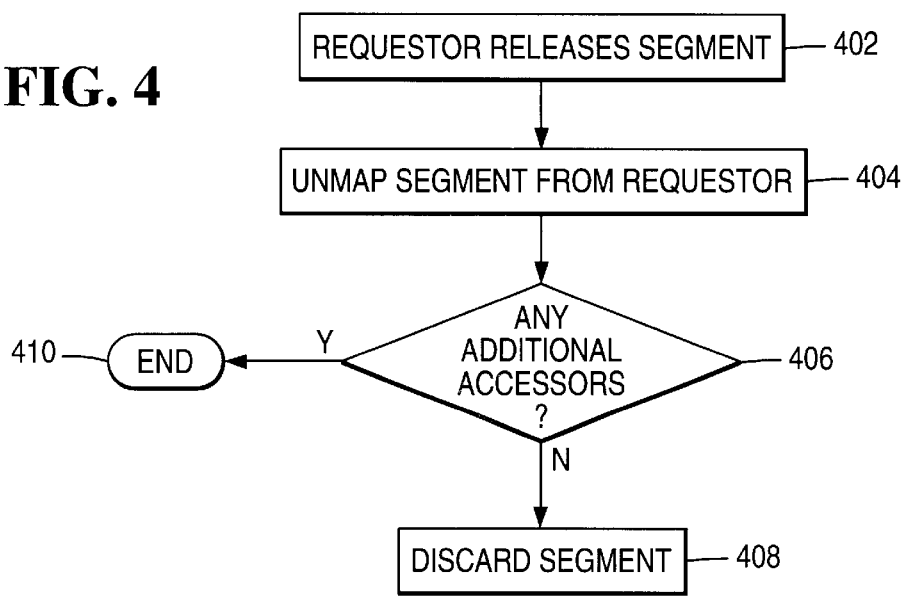
FIG. 4 illustrates the release of a scratch segment in accordance with one or more embodiments of the invention.

FIG. 4 illustrates the release of a segment in accordance with one or more embodiments of the invention. At step 402, the requestor (e.g., network 104) releases the segment of memory (e.g., by indicating the segment is no longer needed). At step 404, the SEG system 206 unmaps the segment 210 from the requestor's virtual address space. At step 406, the SEG system 206 determines if any additional accessors 202 are utilizing the scratch segment 210. If the scratch segment 210 is being utilized by other accessors 202, operations continue as normal and no additional actions are performed at this time by the SEG system (i.e., step 410). If there are no additional accessors 202, the scratch segment 210 may be discarded at step 408 (i.e., placed back onto the available queue 208).

Thus, when a recipient 202 no longer needs the segment 210, the SEG system 206 unmaps the segment 210 from the recipient's virtual address space (step 404). Further, when no further recipients 202 are using the segment 210 (and if deemed appropriate by the SEG system 206), the segment 210 may be discarded/destroyed at step 408 (at which time the SEG daemon 206 may pick up the segment 210 again at step 300 or merely place the elements on the available queue at step 302).

In accordance with one or more embodiments of the invention, the SEG daemon 212 maintains a queue of available memory segments in its virtual memory and delivers the appropriate element representative of the segment to a requestor. The SEG system 206 manages scratch segments 210 backed in a file storage location 204 by maintaining one or more queues 208 with mappings of the offsets and sizes of the scratch segments 210. The mappings are maintained without the network 104 or tasks 202 requesting memory segments and without allocating memory for the segments 210. Upon request, the mapping is transmitted to a user/recipient 202 who can then access the memory 210 directly. Once the recipient 202 no longer needs the scratch segment 210, the segment information is unmapped from the recipient's virtual address space and may be discarded and placed back into the queue of available mappings 208.

One or more embodiments of the invention implement the above functionality by combining two memory-sharing facilities of the WINDOWS NT operating system. The first facility is a global mapping file object 208; the second, is the ability, from within a kernel, to map sections of the file 204 into a task's 202 address space. During system initialization, a mapping file object 208 (i.e., the queue of elements representing available segments 208) is created. The mapping file object 208 is used to map offsets for addressable memory 204 that is backed on a backing store file that will be used to hold all segments 210 allocated, but not currently in the memory of a task 202. In addition, during initialization, the addressable memory 204 may be divided into a fixed number of predetermined-sized segments 210. These pre-allocations reduce lock contention and decrease path length during allocation and de-allocation operations. As each RDBMS task 202 starts, it runs through an initialization section that allocates a file handle to the mapping object 208 and stores that information in a thread specific context block (i.e., the information is placed in the virtual address space/mailbox of the requestor 202 (step 312)). Thus, as each thread allocates and deallocates segment space 210, context information related to that segment 210 is removed from the global space 208 (i.e., the available queue 208), and placed into the thread 202 specific context. At that time, an offset representing a specific physical memory location 204 that is paged or stored in the backing file is mapped into the threads address space. To facilitate segment 210 sharing, the segment 210 can be mapped into another task's 202 address space, independent of the first user's mapping.

As described, embodiments of the invention provide a finer degree of control over shared memory resources and allows implementers of a database to maintain a maximum amount of common code and function between two disparate platforms.

CONCLUSION

This concludes the description of one or more embodiments of the invention. The following paragraphs describe some alternative embodiments for accomplishing the same invention.

In one alternative embodiment, any type of computer, such as a mainframe, minicomputer, or personal computer, could be used to implement the present invention. In addition, programs other than relational database management systems (including but not limited to operating systems, memory managers, etc.) could benefit from the present invention.

In summary, the present invention discloses a subsystem for managing scratch segments by maintaining and managing a queue of scratch segment information (with offsets and segment sizes).

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of managing scratch segments, comprising:
   (a) obtaining addressable memory for scratch segments;
   (b) partitioning the addressable memory into multiple scratch segments of fixed sizes;
   (c) obtaining a file offset for at least one of the scratch segments;
   (d) mapping the file offset in an element in a first virtual address space;
   (e) placing the element in a queue of available scratch segments;
   (f) obtaining a request for a scratch segment; and
   (g) mapping the element into a requestor's virtual address space.

2. The method of claim 1 further comprising dequeuing the element from the queue of available scratch segments.

3. The method of claim 1 wherein mapping the element into a requestor's virtual address space comprises queuing the element in a requestor's mailbox.

4. The method of claim 1 further comprising:
   queuing the element on a completed queue;
   waking up a requestor; and
   waking up a task that performs the initializing.

5. The method of claim 4 further comprising:
   dequeuing the element from the completed queue; and
   unmapping the element from the first virtual address space.

6. The method of claim 1 further comprising:
   receiving a notification from a requestor that the scratch segment is no longer needed;
   unmapping the offset from the requestor's virtual address space;
   determining if an additional requestor is utilizing the scratch segment; and
   discarding the scratch segment if an additional requestor is not utilizing the scratch segment.

7. The method of claim 1 wherein a requestor does not request the scratch segment prior to steps (a)–(e).

8. The method of claim 1 wherein different queues of available scratch segments may be established with each queue containing elements for scratch segments of a certain predetermined size.

9. A system for managing scratch segments in a computer system, comprising:
   (a) addressable memory;
   (b) a SEG daemon configured to:
      (i) obtain the addressable memory for scratch segments;
      (ii) partition the addressable memory into multiple scratch segments of fixed sizes;
      (iii) obtain a file offset for at least one of the scratch segments;
      (iv) map the file offset in an element;
      (v) place the element in a queue of available scratch segments;

(vi) obtain a request for a scratch segment; and (vii) map the element into a requestor's virtual address space.

10. The system of claim 9 wherein the SEG daemon is further configured to unlock the scratch segment and dequeue the element from the queue of available scratch segments.

11. The system of claim 9 wherein the SEG daemon is further configured to provide the scratch segment to the requestor by queuing the element in the requestor's mailbox.

12. The system of claim 9, the SEG daemon further configured to:

check a completed queue for any elements;

dequeue the element from the completed queue; and unmap the file offset in the element from the SEG daemon's virtual address space.

13. The system of claim 9 further comprising a component configured to:

receive a notification from the requestor that the scratch segment is no longer needed;

unmap the offset from a virtual address space of the requestor;

determine if an additional requester is utilizing the scratch segment; and discard the scratch segment if an additional requestor is not utilizing the scratch segment.

14. The system of claim 9 wherein the SEG daemon performs steps (i)–(v) prior to receiving a request for the scratch segment.

15. The system of claim 9 wherein different queues of available scratch segments elements may be established with each queue containing elements for scratch segments of a certain predetermined size.

16. An article of manufacture embodying logic for implementing a method for managing scratch segments in a computer system, the method comprising:

(a) obtaining addressable memory for scratch segments;

(b) partitioning the addressable memory into multiple scratch segments of fixed sizes;

(c) obtaining a file offset for at least one of the scratch segments;

(d) mapping the file offset in an element in a first virtual address space;

(e) placing the element in a queue of available scratch segments;

(f) obtaining a request for a scratch segment; and (g) mapping the element into a requestor's virtual address space.

17. The article of manufacture of claim 16 further comprising dequeuing the element from the queue of available scratch segments.

18. The article of manufacture of claim 16 wherein mapping the element into a requestor's virtual address space comprises queuing the element in a requestor's mailbox.

19. The article of manufacture of claim 16, the method further comprising:

queuing the element on a completed queue;

waking up a requester; and waking up a task that performs the initializing.

20. The article of manufacture of claim 19, the method further comprising:

dequeuing the element from the completed queue; and unmapping the element from the first virtual address space.

21. The article of manufacture of claim 16, the method further comprising:

receiving a notification from a requester that the scratch segment is no longer needed;

unmapping the element from the requestor's virtual address space;

determining if an additional requestor is utilizing the scratch segment; and discarding the scratch segment if an additional requester is not utilizing the scratch segment.

22. The article of manufacture of claim 16 wherein a requestor does not request the scratch segment prior to the performance of steps (a)–(e).

23. The article of manufacture of claim 16 wherein different queues of available scratch segments may be established with each queue containing elements for scratch segments of a certain predetermined size.

* * * * *